(12) United States Patent
Cidon et al.

(10) Patent No.: US 7,990,887 B2
(45) Date of Patent: Aug. 2, 2011

(54) SAMPLING TEST OF NETWORK PERFORMANCE

(75) Inventors: Israel Cidon, Haifa (IL); Lior Z Horn, Yoqneam Illit (IL); Moshe Sidi, Haifa (IL); Benny Zangiri, Zichron Yaakov (IL)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 11/359,723

(22) Filed: Feb. 22, 2006

(65) Prior Publication Data

US 2007/0195707 A1     Aug. 23, 2007

(51) Int. Cl.
*H04J 1/16* (2006.01)

(52) U.S. Cl. ........ 370/253; 370/241; 370/248; 370/238; 370/252

(58) Field of Classification Search ............ 370/252, 370/241, 431, 458, 459, 241.1, 242, 244, 370/245, 248, 238, 253; 379/1.01, 22, 22.03, 379/22.04, 22.05
See application file for complete search history.

(56) References Cited

U.S. PATENT DOCUMENTS

| | | | |
|---|---|---|---|
| 5,341,456 A * | 8/1994 | DeJaco ................. | 704/214 |
| 5,477,531 A | 12/1995 | McKee et al. | |
| 5,648,965 A | 7/1997 | Thadani et al. | |
| 5,678,002 A | 10/1997 | Fawcett et al. | |
| 5,812,529 A | 9/1998 | Czarnik et al. | |
| 5,838,919 A | 11/1998 | Schwaller et al. | |
| 5,881,237 A | 3/1999 | Schwaller et al. | |
| 5,958,010 A | 9/1999 | Agarwal et al. | |
| 6,006,268 A | 12/1999 | Coile et al. | |
| 6,029,258 A | 2/2000 | Ahmad | |
| 6,115,751 A | 9/2000 | Tam et al. | |
| 6,269,330 B1 * | 7/2001 | Cidon et al. ................. | 714/43 |
| 6,278,710 B1 * | 8/2001 | Eidson ................. | 370/394 |
| 6,327,620 B1 | 12/2001 | Tams et al. | |
| 6,363,053 B1 | 3/2002 | Schuster et al. | |
| 6,385,204 B1 | 5/2002 | Hoefelmeyer et al. | |
| 6,397,359 B1 | 5/2002 | Chandra et al. | |
| 6,438,711 B2 | 8/2002 | Woodruff | |
| 6,467,041 B1 | 10/2002 | Blam | |
| 6,618,389 B2 | 9/2003 | Hoefelmeyen et al. | |

(Continued)

FOREIGN PATENT DOCUMENTS

WO    WO 01/82022    11/2001

(Continued)

OTHER PUBLICATIONS

Hernandez, "Gigabit Ethernet Auto-Negotiation", Dell™ Power Solutions (Issue 1, 2001), pp. 117-122.

(Continued)

*Primary Examiner* — Ricky Ngo
*Assistant Examiner* — Dewanda Samuel
(74) *Attorney, Agent, or Firm* — Ladas & Parry LLP

(57) ABSTRACT

A method for testing a communication network includes transmitting a flow of test packets over a path through the network. The flow includes a series of bursts of the test packets separated by intervals having an interval duration, each burst comprising a sequence of the test packets and having a burst duration less than the interval duration. Arrival characteristics of the test packets in the flow are measured at a receiving end of the path. The arrival characteristics include at least one of a packet loss characteristic, a packet delay characteristic, and a packet jitter characteristic. A quality defect in the network is detected based on the measured arrival characteristics.

9 Claims, 2 Drawing Sheets

U.S. PATENT DOCUMENTS

| | | |
|---|---|---|
| 6,622,157 B1 | 9/2003 | Heddaya et al. |
| 6,665,820 B1 | 12/2003 | Frowein et al. |
| 6,697,962 B1 | 2/2004 | McCrory et al. |
| 6,700,891 B1 | 3/2004 | Wong |
| 6,845,394 B2 | 1/2005 | Ritche |
| 6,865,691 B1 | 3/2005 | Brundridge et al. |
| 6,868,094 B1 * | 3/2005 | Bordonaro et al. ........... 370/516 |
| 6,883,118 B2 | 4/2005 | Morgan et al. |
| 6,958,977 B1 | 10/2005 | Mitrani et al. |
| 6,990,616 B1 * | 1/2006 | Botton-Dascal et al. ..... 714/715 |
| 7,430,179 B2 * | 9/2008 | Towns-von Stauber et al. ............................ 370/252 |
| 7,688,741 B2 * | 3/2010 | Botton-Dascal et al. ..... 370/241 |
| 2002/0144187 A1 | 10/2002 | Morgan et al. |
| 2002/0181494 A1 * | 12/2002 | Rhee ............................ 370/465 |
| 2002/0193999 A1 * | 12/2002 | Keane et al. .................. 704/270 |
| 2003/0152028 A1 * | 8/2003 | Raisanen et al. ............. 370/235 |
| 2003/0161321 A1 * | 8/2003 | Karam et al. ................. 370/516 |
| 2004/0105392 A1 * | 6/2004 | Charcranoon ................ 370/252 |
| 2004/0205183 A1 * | 10/2004 | Bowman ....................... 709/224 |
| 2004/0223458 A1 * | 11/2004 | Gentle .......................... 370/230 |
| 2005/0123003 A1 * | 6/2005 | Bordonaro et al. ........... 370/516 |
| 2005/0215208 A1 * | 9/2005 | Stoddard et al. ............ 455/115.2 |
| 2006/0034429 A1 * | 2/2006 | Ruetschi et al. ........... 379/32.01 |
| 2007/0070896 A1 * | 3/2007 | Alapuranen et al. .......... 370/230 |
| 2009/0213835 A1 * | 8/2009 | Smith ........................... 370/352 |

FOREIGN PATENT DOCUMENTS

WO  WO 01/95053  12/2001

OTHER PUBLICATIONS http://www.ethermanage.com/ethernet/autoneg.html, 2005.
http://www.cites.uiuc.edu/network/autosense.html 2005.
http://www.scyld.com/Nway.html 2005.
DSLREPORTS.com, http://web.archive.org/web/20001006044612, Published by WaybackMachine, Oct. 6, 2000, 2 pages.
DSLREPORTS.com, http://web.archive.org/web/20000620184719, Published by WaybackMachine, Jun. 6, 2000, 2 pages.

* cited by examiner

SAMPLING TEST OF NETWORK PERFORMANCE

FIELD OF THE INVENTION

The present invention relates generally to digital communication networks, and specifically to testing performance characteristics of packet communication networks.

BACKGROUND OF THE INVENTION

Various tools are known in the art for automated testing of packet network performance. For example, U.S. Pat. No. 5,812,529, whose disclosure is incorporated herein by reference, describes a system and method for acquiring network performance data, built around a "mission server," which interfaces with clients to receive requests for "missions." A typical mission includes operations such as transmission and reception of data packets among devices connected to segments of the network. The mission is performed and/or supported by "sentries," typically software agents running on stand-alone network devices or end-points. The sentries carry out mission operations in response to commands from the mission server, and report back to the mission server on the mission results.

U.S. Pat. Nos. 5,838,919 and 5,881,237, whose disclosures are incorporated herein by reference, describe methods, systems and computer program products for testing of network performance using test scenarios that simulate actual communications traffic between network endpoints. Specific test protocols are assigned to endpoint nodes on the network. Typically, the nodes are paired, and one of the nodes in the pair communicates the protocol to the other, associated node. A console node sets up the test protocols, initiates their execution and receives data on the test performance from the endpoint nodes.

U.S. Pat. No. 6,269,330, whose disclosure is incorporated herein by reference, describes a method and apparatus for testing a network having a plurality of nodes. The method includes sending commands to one or more traffic agents connected to the network and to at least one network management agent coupled to a respective node of the network, transmitting data from at least one of the traffic agents over the network responsive to the commands, determining network information at the at least one network management agent responsive to the commands and to transmission of the data through the respective node, and receiving and evaluating the network information to assess a state of the network. Aspects of the methods described in U.S. Pat. No. 6,269,330 are embodied in an Active Testing Framework (ATF) known as NetAlly™, available from Viola Networks (Yokneam, Israel).

PCT Patent Publication WO 01/82022 A2, whose disclosure is incorporated herein by reference, describes a method for testing of a communication network using a plurality of traffic agents. The method includes transmitting a sequence of data packets via the network from a first traffic agent to a second traffic agent, and recording arrival characteristics of the packets responsively to receiving the packets at the second traffic agent. The arrival characteristics of different packets in the sequence are compared so as to determine a measure of variability in transmission of the packets via the network.

SUMMARY OF THE INVENTION

Real-time packet network applications, such as Voice over Internet Protocol (VoIP) communications, require consistent high-quality end-to-end transmission, with low levels of transmission quality defects such as packet loss, jitter and delay. As network conditions may change over time, it is desirable to monitor transmission quality continuously, or at least periodically, in order to verify that adequate quality is maintained. VoIP transmission quality can be monitored, for example, by transmitting packets that simulate VoIP calls between network endpoints and measuring the arrival characteristics of the packets, as described, for example, in the above-mentioned PCT patent publication. The simulated packet traffic, however, tends to strain the resources of the very network switches that it is meant to test, and may therefore cause unacceptable quality reduction in actual VoIP calls between network users during the test.

Embodiments of the present invention provide methods and systems for testing network performance while minimizing the impact of the testing on actual network user traffic. In the disclosed embodiments, a transmitting network node transmits one or more bursts of packets over the network to a receiving node. Each burst comprises a sequence of packets that follow one another closely, so as to emulate the characteristics of continuous packet traffic, such as real-time VoIP traffic. The receiving node measures the arrival characteristics of the packets in each burst and thus provides a representative sampling of the response of the network to continuous traffic. On the other hand, the overall duration and duty cycle of the bursts is sufficiently low so that the impact on user traffic is minimal.

Although the embodiments described herein are directed mainly to monitoring transmission quality of specific types of real-time packet traffic, and especially VoIP traffic, the principles of the present invention are not limited to any particular type of traffic and may be used generally in a wide range of network testing and monitoring applications.

There is therefore provided, in accordance with an embodiment of the present invention, a method for testing a communication network, including:

transmitting a flow of test packets over a path through the network, the flow including a series of bursts of the test packets separated by intervals having an interval duration, each burst including a sequence of the test packets and having a burst duration less than the interval duration;

measuring arrival characteristics of the test packets in the flow at a receiving end of the path, the arrival characteristics including at least one of a packet loss characteristic, a packet delay characteristic, and a packet jitter characteristic; and detecting a quality defect in the network based on the measured arrival characteristics.

In disclosed embodiments, transmitting the flow includes generating the test packets so as to emulate, within each burst, packet transmission characteristics of a specified real-time protocol, wherein generating the test packets includes determining a packet size and data rate of the test packets within each burst so as to emulate a codec used in the real-time protocol. Typically, the real-time protocol includes a Voice over IP (VoIP) protocol.

In some embodiments, the burst duration is no more than one tenth of the interval duration. Additionally or alternatively, the burst duration is no more than 1 sec, and each burst includes no more than fifty of the test packets.

In a disclosed embodiment, detecting the quality defect includes computing a statistical feature of the arrival characteristics of the test packets over the series of the bursts while disregarding the arrival characteristics of one or more initial test packets in each burst.

The test flow may be transmitted periodically, concurrently with transmission of user traffic through the network There is also provided, in accordance with an embodiment of the present invention, a method for testing a communication network, including:

transmitting a burst of test packets over a path through the network, the burst including a sequence of no more than fifty of the test packets and having a burst duration no greater than 1 sec;

measuring arrival characteristics of the test packets in the burst at a receiving end of the path, the arrival characteristics including at least one of a packet loss characteristic, a packet delay characteristic, and a packet jitter characteristic; and detecting a quality defect in the network based on the measured arrival characteristics.

There is additionally provided, in accordance with an embodiment of the present invention, apparatus for testing a communication network, including:

first and second traffic agents, which are coupled to respective end points of a path through the network; and a testing center, which is coupled to instruct at least the first traffic agent to transmit a flow of test packets over the path through the network, the flow including a series of bursts of the test packets separated by intervals having an interval duration, each burst including a sequence of the test packets and having a burst duration less than the interval duration, and to instruct at least the second traffic agent to measure arrival characteristics of the test packets in the flow at a receiving end of the path, the arrival characteristics including at least one of a packet loss characteristic, a packet delay characteristic, and a packet jitter characteristic, wherein the testing center is adapted to detect a quality defect in the network based on the measured arrival characteristics.

There is further provided, in accordance with an embodiment of the present invention, apparatus for testing a communication network, including:

first and second traffic agents, which are coupled to respective end points of a path through the network; and a testing center, which is coupled to instruct at least the first traffic agent to transmit a burst of test packets over a path through the network, the burst including a sequence of no more than fifty of the test packets and having a burst duration no greater than 1 sec, and to instruct at least the second traffic agent to measure arrival characteristics of the test packets in the burst at a receiving end of the path, the arrival characteristics including at least one of a packet loss characteristic, a packet delay characteristic, and a packet jitter characteristic, wherein the testing center is adapted to detect a quality defect in the network based on the measured arrival characteristics.

There is moreover provided, in accordance with an embodiment of the present invention, a computer software product for testing a communication network in conjunction with first and second traffic agents, which are coupled to respective end points of a path through the network, the product including a computer-readable medium in which program instructions are stored, which instructions, when read by a computer, cause the computer to instruct at least the first traffic agent to transmit a flow of test packets over the path through the network, the flow including a series of bursts of the test packets separated by intervals having an interval duration, each burst including a sequence of the test packets and having a burst duration less than the interval duration, and to instruct at least the second traffic agent to measure arrival characteristics of the test packets in the flow at a receiving end of the path, the arrival characteristics including at least one of a packet loss characteristic, a packet delay characteristic, and a packet jitter characteristic, wherein the instructions cause the computer to detect a quality defect in the network based on the measured arrival characteristics.

There is furthermore provided, in accordance with an embodiment of the present invention, a computer software product for testing a communication network in conjunction with first and second traffic agents, which are coupled to respective end points of a path through the network, the product including a computer-readable medium in which program instructions are stored, which instructions, when read by a computer, cause the computer to instruct at least the first traffic agent to transmit a burst of test packets over a path through the network, the burst including a sequence of no more than fifty of the test packets and having a burst duration no greater than 1 sec, and to instruct at least the second traffic agent to measure arrival characteristics of the test packets in the burst at a receiving end of the path, the arrival characteristics including at least one of a packet loss characteristic, a packet delay characteristic, and a packet jitter characteristic, wherein the instructions cause the computer to detect a quality defect in the network based on the measured arrival characteristics.

The present invention will be more fully understood from the following detailed description of the embodiments thereof, taken together with the drawings in which:

DETAILED DESCRIPTION OF EMBODIMENTS

Figure 1:
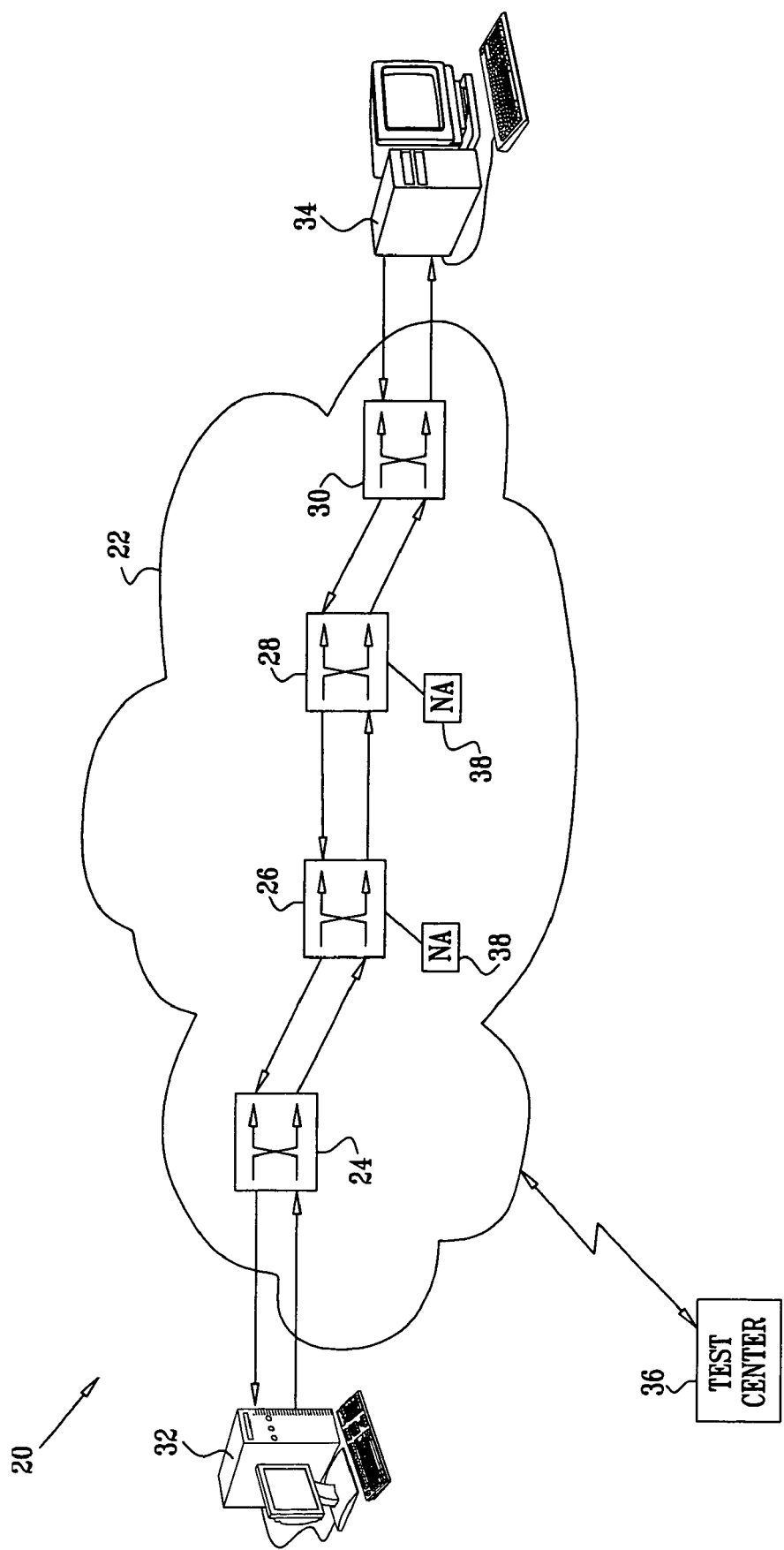
FIG. 1 is a block diagram that schematically illustrates a system for testing a communication network, in accordance with an embodiment of the present invention.

FIG. 1 is a block diagram that schematically illustrates a distributed testing system 20, which is used to perform diagnostic testing and monitoring on a network 22, in accordance with an embodiment of the present invention. Network 22 may comprise substantially any sort of packet network known in the art, such as a local- or wide-area network (LAN or WAN) or a combination of such networks. Network 22 comprises switching hardware, represented schematically in FIG. 1 as switches 24, 26, 28 and 30. Typically, the switches comprises LAN hubs or Internet Protocol (IP) routers, as are known in the art, although the principles of the present invention are also applicable in other protocol environments. Switches 24, 26, 28 and 30 define a communication path through network 22.

Testing system 20 comprises nodes that are configured as end-point traffic agents 32 and 34, which in this example are coupled to ports of switches 24 and 30 at the end points of the path through network 22. Typically, traffic agents 32 and 34 may serve as both traffic generators, transmitting test packets through the network, and as traffic analyzers, receiving the test packets and assembling information regarding the received packets, as described in detail hereinbelow. The traffic agents are typically implemented as software processes running on host computers connected to the network. These host computers may optionally comprise add-on hardware devices to accommodate the needs of the traffic agents. Alternatively or additionally, traffic agents may be implemented as stand-alone devices, independent of host computers. As a further option, traffic agents 32 and 34 may comprise Cisco Service Assurance Agents (SAAs), which are deployed in conjunction with network equipment produced by Cisco Systems (San Jose, Calif.), or other, similar sorts of agents offered by other vendors. The SAAs may be programmed to carry out the functions of the traffic agents that are described hereinbelow.

Testing system 20 may also comprise one or more network agents 38, which are associated with one or more of the switches in network 22 (in this example, switches 26 and 28). These and other aspects of testing systems using traffic agents and network agents are described in the above-mentioned U.S. Pat. No. 6,269,330 and PCT Patent Publication WO 01/82022.

System 20 further comprises a testing center 36, which is typically implemented as a software process executed on a network management host. Testing center 36 may run on the same host as one of traffic agents 32 and 34 or on a different host. The software for the testing center, as well as software for carrying out the functions of the traffic agents, is typically conveyed to the respective computers via network 22. Alternatively or additionally, the software may be supplied on tangible media, such as CD-ROM, for installation on the respective computers. Typically, testing center 36 communicates through network 22 with one or more of the traffic agents, as well as with network agents 38. Alternatively or additionally, different communication means, independent of network 22, such as modem dialup lines or separate Internet connections, may be used to communicate with some or all of the traffic agents.

Testing center 36 typically conducts the tests that are described hereinbelow by transmitting appropriate commands to traffic agents 32 and 34 and, optionally, to network agents 38. Subsequently the testing center receives reports from the agents. The testing center processes the reports, evaluates performance of network 22 based on the reports, and displays the test results to a network operator. The tests may be initiated by the operator, or they may be carried out automatically by the test center periodically and/or when a fault condition is suspected. When the tests are carried out automatically, and a fault condition is detected, the testing center may generate an alarm in order to notify the operator that a fault has occurred.

Figure 2:
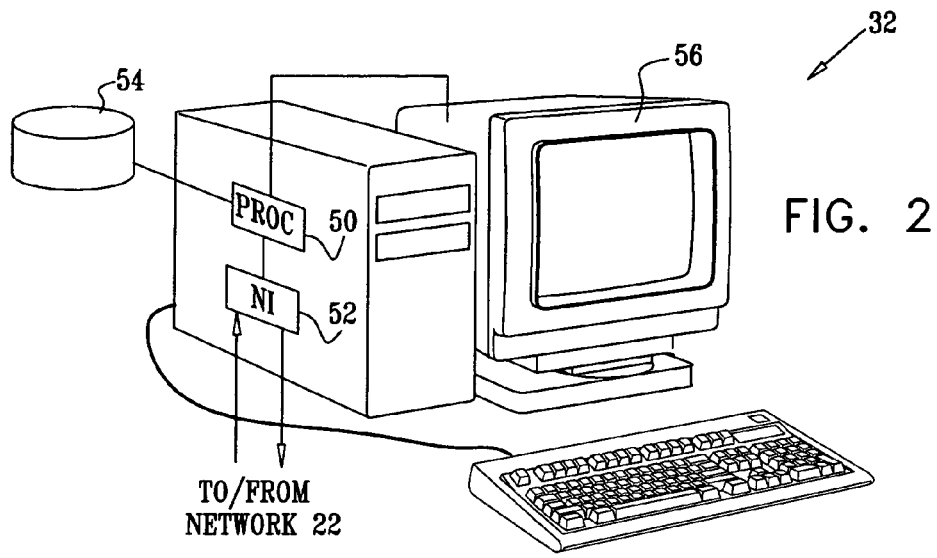
FIG. 2 is a block diagram that schematically illustrates a traffic agent, in accordance with an embodiment of the present invention.

FIG. 2 is a block diagram that schematically shows details of traffic agent 32, in accordance with an embodiment of the present invention. Traffic agent 34 and testing center 36 may be similarly constructed. As noted above, the traffic agent typically comprises a computer, which comprises a processor 50 and a network interface 52 for communicating with network 22. When the traffic agent conducts a test, processor 50 stores test results in a memory 54 and then processes and passes the results to the testing center for analysis. The results of the analysis are displayed on an output device 56, such as a computer monitor.

Figure 3:
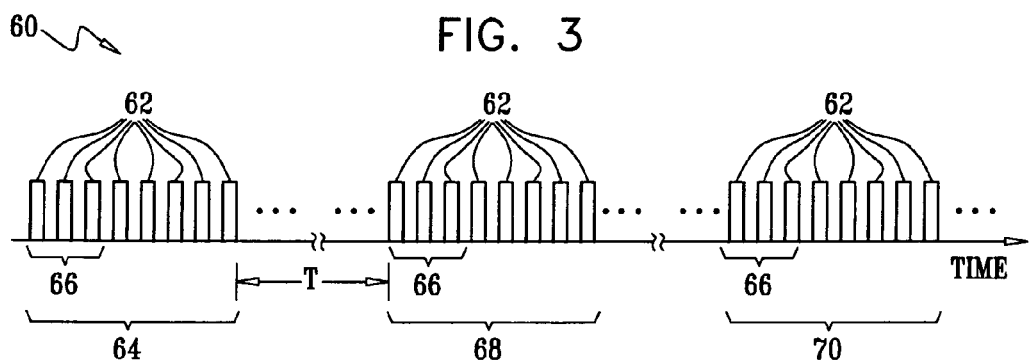
FIG. 3 is a timing diagram that schematically illustrates a sequence of test packets, in accordance with an embodiment of the present invention.

FIG. 3 is a timing diagram that schematically illustrates a sequence 60 of test packets 62 transmitted by one of traffic agents 32 and 34, in accordance with an embodiment of the present invention. (This sort of sequence may be transmitted by either of the traffic agents or by both traffic agents, in succession or simultaneously.) Packets 62 are transmitted in a series of bursts 64, 68, 70, . . . , separated by intervals of duration T. In order to reduce the impact of the test packets on user traffic carried concurrently by network 22, the duration of each burst is substantially less than the interval T. Typically, each burst lasts no more than 1 sec and contains no more than 50 packets, while the interval between bursts is 6 sec or more. Alternatively, other test parameters may be chosen. It is desirable (although not essential) that the interval duration be at least ten times the burst duration. As a result, even if users do experience some disturbance of service as a result of transmission of sequence 60, the disturbance will be brief and transient.

The packet parameters, such as packet size and data rate, are typically chosen so as to emulate a certain type of network traffic with respect to which the performance of network 22 is to be tested. In one embodiment, in order to emulate VoIP traffic, packets 62 comprise Real-Time Protocol (RTP) packets, whose size and data rate are chosen according to a certain codec used in VoIP. For example, if the G.723 codec is chosen for emulation, each of packets 62 comprises 24 bytes of payload data at an overall data rate during each burst of 6.4 kbps, i.e., 33 packets/sec. Other codecs may be used in the same manner, with concomitant variations in the packet size and rate. Sequence 60 may typically comprise eighteen bursts 64, 68, 70, . . . , separated by intervals T of 10 sec, so that the overall duration of the sequence is 3 min, similar to a typical telephone call. In another example, thirty bursts of twenty-five packets each are separated by intervals T of 6 sec. As a result of the appropriate choice of test parameters, collection of packet arrival statistics over the entire sequence will yield a statistical distribution of results that is similar to that encountered in a call placed by a network user. Alternatively, longer or shorter sequences of bursts may be used.

Because packets 62 are transmitted in bursts, buffers and queues in switches 24, 26, 28, . . . , along the packet path may be empty when the initial packets in each burst arrive. The initial packets "prime" the buffers and queues for the later packets in each burst, so that the later packets encounter actual call conditions, including latency (delay), jitter and packet loss that may occur when a buffer or queue is full. (For this reason, packets 62 are transmitted in bursts, rather than being spaced evenly over the duration of the test transmission.) Therefore, the arrival characteristics of the initial packets in each burst may not be meaningful in assessing network performance under actual call conditions. Consequently, when the test results are analyzed, a certain number of initial packets 66 in each burst may be disregarded. In a typical test, each burst comprises eight packets (i.e., a burst duration of 240 ms using G.723), and the first three packets in each burst are disregarded. These test parameters are cited only by way of example, and larger or smaller values may be used, as well.

Figure 4:
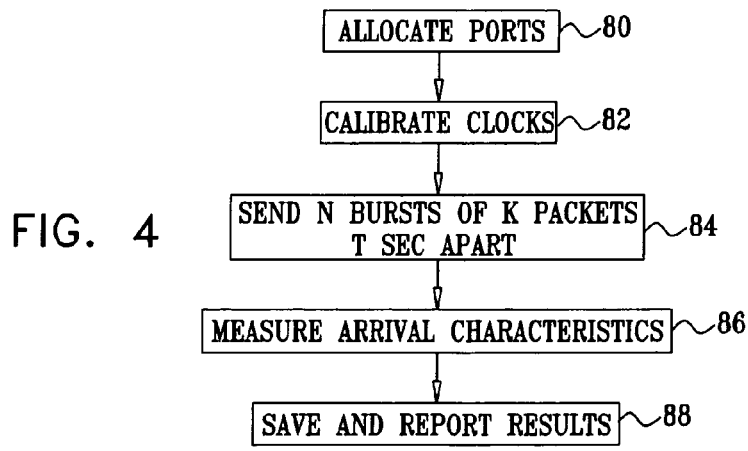
FIG. 4 is a flow chart that schematically illustrates a method for network testing, in accordance with an embodiment of the present invention.

FIG. 4 is a flow chart that schematically illustrates a method for testing performance of network 22, in accordance with an embodiment of the present invention. The test uses traffic agents 32 and 34 to transmit and measure arrival characteristics of a flow of packets through network 22, having the general form of sequence 60 (FIG. 3). Typically, the measured arrival characteristics include one or more of the following measurements:

Packet loss.
Throughput.
Delay (latency).
Jitter (variability of delay).
Misordering (receipt of packets out of order, relative to the order of transmission).
Loss burstiness (the extent to which lost packets are bunched together in the packet sequence).

Exemplary methods for measuring these characteristics are described in the above-mentioned PCT Patent Publication WO 01/82022. Alternatively or additionally, any other arrival characteristics that are known in the art may be measured, and other measurement methods may be used.

To begin the test, test center 36 instructs traffic agents 32 and 34 to allocate ports for sending and receiving test packets, at a port allocation step 80. The traffic agent software running on the respective nodes detects free ports that can be used for the test and then takes possession of the ports for the duration of the test.

Because some of the measured arrival characteristics, such as the delay, are time-dependent, the local clocks of the traffic agents are calibrated before carrying out the actual tests, at a clock calibration step 82. For this purpose, traffic agent 32 transmits a stream of packets, typical User Datagram Protocol (UDP) packets, to traffic agent 34, and traffic agent 34 echoes the packets back to traffic agent 32. Each traffic agent adds a timestamp to each packet that it sends, indicating the time of transmission, and records the times of arrival of the packets that it receives. By comparing the transmission timestamps to the arrival times of the packets at each traffic agent, a raw (uncalibrated) average one-way path delay may be calculated. Under light traffic conditions, the queuing delay along the path is small in both directions. The propagation delay, which is not affected by the traffic, is either small (when traversing a LAN, for example) or is at least approximately symmetrical (typical in WANs, in which routing decisions are symmetrical). Therefore, in such situations, the difference in the average raw one-way path delays measured by the two traffic agents is indicative of the clock offset between the two traffic agents and the symmetrical propagation delay. This clock offset is computed based on the measured path delays and is used subsequently in accurately measuring the path delay under heavy traffic conditions.

Once the clocks have been calibrated, testing center 36 instructs traffic agent 32 to transmit test sequence 60, at a transmission step 84. The test sequence comprises N bursts of K packets each, with a given packet size and data rate, spaced by intervals of T sec, as described above. The values of these test parameters may be pre-programmed in the traffic agent software or may be specified in the instructions sent from the testing center.

Traffic agent 34 receives and measures the arrival characteristics of the packets in the test sequence, at a measurement step 86. In an exemplary embodiment, traffic agent 34 measures the average delay, average jitter, and fraction of packets lost. Alternatively or additionally, other parameters may be measured, such as those listed above, as well as other arrival characteristics that are known in the art. As noted above, in computing averages and other statistical measures of the arrival characteristics, traffic agent 34 typically ignores initial packets 66, wherein the number of initial packets to ignore may also be pre-programmed or specified by the testing center.

Optionally, testing center 36 may instruct traffic agent 34 to transmit similar test sequences to traffic agent 32, either simultaneously with or subsequent to the transmission at step 84.

Traffic agent 34 (and possible traffic agent 32, as well) passes the test results to testing center 36, at a reporting step 88. The testing center processes and saves the results and analyzes the results over time in order to generate reports to the system operator. For example, in VoIP-related testing, the testing center may compute a mean opinion score (MOS), which is a standard indicator of line quality, based on the measured arrival characteristics, and may then display a plot of MOS over time. The MOS may be computed for each codec that is simulated by a corresponding test packet sequence. The testing center may then determine and display the percentage of the simulated calls for each codec for which the MOS was above a predetermined threshold. Low MOS scores indicate to the operator that call quality is inadequate, so that corrective action should be taken. In this case, the operator may evaluate local transmission characteristics monitored by network agents 38 in order to localize the source of the problem. Other test statistics may be reported and evaluated in like manner.

Although the embodiments described hereinabove are directed mainly to monitoring transmission quality of specific types of real-time packet traffic, and especially VoIP traffic, the principles of the present invention are not limited to any particular type of traffic and may be used generally in a wide range of network testing and monitoring applications. Other exemplary applications include video conference over IP (VCoIP) and broadcast video over IP (IPTV). It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for testing a communication network, comprising:
   generating a flow of test packets, the flow comprising a series of bursts of the test packets separated by intervals having an interval duration, each burst comprising a sequence of the test packets and having a burst duration less than the interval duration, wherein generating the flow comprises generating a test packet having a packet size and data rate chosen according to a predetermined codec used in Voice over Internet Protocol (VoIP);
   transmitting the flow of test packets over a path through the network;
   measuring arrival characteristics of the test packets in the flow at a receiving end of the path, the arrival characteristics comprising at least one of a packet loss characteristic, a packet delay characteristic, and a packet jitter characteristic; and
   detecting a quality defect in the network based on the measured arrival characteristics;
   said detecting a quality defect by computing a statistical feature of said arrival characteristics of the test packets over said series of bursts while disregarding the arrival characteristics of an initial test packet in each burst;
   computing, for the predetermined codec, a Mean Opinion Score (MOS) for each burst based on the arrival characteristics of the test packets thereof;
   determining the percentage of bursts in the series for which a corresponding MOS is above a predetermined threshold; and
   determining whether call quality over the communication network is inadequate based on a percentage of bursts in the series for which the corresponding MOS is lower than the predetermined threshold.

2. The method according to claim 1, wherein the burst duration is no more than one tenth of the interval duration.

3. The method according to claim 1, wherein the burst duration is no more than 1 sec.

4. The method according to claim 1, wherein each burst comprises no more than fifty of the test packets.

5. A method for testing a communication network, comprising:
   generating a burst of test packets, the burst comprising a sequence of no more than fifty of the test packets and having a burst duration no greater than 1 sec, wherein generating the flow comprises generating a test packet having a packet size and data rate chosen according to a predetermined codec used in Voice over Internet Protocol (VoIP);

transmitting the burst of test packets over a path through the network;

measuring arrival characteristics of the test packets in the burst at a receiving end of the path, the arrival characteristics comprising at least one of a packet loss characteristic, a packet delay characteristic, and a packet jitter characteristic; and detecting a quality defect in the network based on the measured arrival characteristics;

said detecting a quality defect comprising by a statistical feature of said arrival characteristics of the test packets over said series of bursts while disregarding the arrival characteristics of an initial test packet in each burst;

computing, for the predetermined codec, a Mean Opinion Score (MOS) for each burst based on the arrival characteristics of the test packets thereof;

determining the percentage of bursts in the series for which a corresponding MOS is above a predetermined threshold; and determining whether call quality over the communication network is inadequate based on a percentage of bursts in the series for which the corresponding MOS is lower than the predetermined threshold.

6. Apparatus for testing a communication network, comprising:

first and second traffic agents, which are coupled to respective end points of a path through the network; and a testing center, which is coupled to instruct at least the first traffic agent to transmit a flow of test packets having a packet size and data rate chosen according to a predetermined codec used in Voice over Internet Protocol (VoIP) over the path through the network, the flow comprising a series of bursts of the test packets separated by intervals having an interval duration, each burst comprising a sequence of the test packets and having a burst duration less than the interval duration, and to instruct at least the second traffic agent to measure arrival characteristics of the test packets in the flow at a receiving end of the path, the arrival characteristics comprising at least one of a packet loss characteristic, a packet delay characteristic, and a packet jitter characteristic, said testing center being adapted to detect a quality defect in the network based on the measured arrival characteristics; and said testing center being arranged to:
compute a statistical feature of the arrival characteristics of the test packets over the series of the bursts while disregarding the arrival characteristics of an initial test packet in each burst;
compute, for the predetermined codec, a Mean Opinion Score (MOS) for each burst based on the arrival characteristics of the test packets thereof;
determine the percentage of bursts in the series for which a corresponding MOS is above a predetermined threshold; and
determine whether call quality over the communication network is inadequate based on a percentage of bursts in the series for which the corresponding MOS is lower than the predetermined threshold.

7. Apparatus for testing a communication network, comprising:

first and second traffic agents, which are coupled to respective end points of a path through the network; and a testing center, which is coupled to instruct at least the first traffic agent to transmit a burst of test packets having a packet size and data rate chosen according to a predetermined codec used in Voice over Internet Protocol (VoIP) over a path through the network, the burst comprising a sequence of no more than fifty of the test packets and having a burst duration no greater than 1 sec, and to instruct at least the second traffic agent to measure arrival characteristics of the test packets in the burst at a receiving end of the path, the arrival characteristics comprising at least one of a packet loss characteristic, a packet delay characteristic, and a packet jitter characteristic, said testing center being adapted to detect a quality defect in the network based on the measured arrival characteristics;

said testing center being arranged to:
compute a statistical feature of the arrival characteristics of the test packets over the series of the bursts while disregarding the arrival characteristics of an initial test packet in each burst;
compute, for the predetermined codec, a Mean Opinion Score (MOS) for each burst based on the arrival characteristics of the test packets thereof;
determine the percentage of bursts in the series for which a corresponding MOS is above a predetermined threshold; and
determine whether call quality over the communication network is inadequate based on a percentage of bursts in the series for which the corresponding MOS is lower than the predetermined threshold.

8. A computer software product for testing a communication network in conjunction with first and second traffic agents, which are coupled to respective end points of a path through the network, the product comprising a non-transitory computer-readable medium in which program instructions are stored, which instructions, when read by a computer, cause the computer to instruct at least the first traffic agent to transmit a flow of test packets having a packet size and data rate chosen according to a predetermined codec used in Voice over Internet Protocol (VoIP) over the path through the network, the flow comprising a series of bursts of the test packets separated by intervals having an interval duration, each burst comprising a sequence of the test packets and having a burst duration less than the interval duration, and to instruct at least the second traffic agent to measure arrival characteristics of the test packets in the flow at a receiving end of the path, the arrival characteristics comprising at least one of a packet loss characteristic, a packet delay characteristic, and a packet jitter characteristic, the instructions causing the computer to detect a quality defect in the network based on the measured arrival characteristics;

the instructions causing the computer to:
compute a statistical feature of the arrival characteristics of the test packets over the series of the bursts while disregarding the arrival characteristics of an initial test packet in each burst;
compute, for the predetermined codec, a Mean Opinion Score (MOS) for each burst based on the arrival characteristics of the test packets thereof;
determine the percentage of bursts in the series for which a corresponding MOS is above a predetermined threshold; and
determine whether call quality over the communication network is inadequate based on a percentage of bursts in the series for which the corresponding MOS is lower than the predetermined threshold.

9. A computer software product for testing a communication network in conjunction with first and second traffic agents, which are coupled to respective end points of a path through the network, the product comprising a non-transitory computer-readable medium in which program instructions are stored, which instructions, when read by a computer, cause the computer to instruct at least the first traffic agent to transmit a burst of test packets having a packet size and data rate chosen according to a predetermined codec used in Voice over Internet Protocol (VoIP) over a path through the network, the burst comprising a sequence of no more than fifty of the test packets and having a burst duration no greater than 1 sec, and to instruct at least the second traffic agent to measure arrival characteristics of the test packets in the burst at a receiving end of the path, the arrival characteristics comprising at least one of a packet loss characteristic, a packet delay characteristic, and a packet jitter characteristic, the instructions causing the computer to detect a quality defect in the network based on the measured arrival characteristics;

the instructions causing the computer to:
compute a statistical feature of the arrival characteristics of the test packets over the series of the bursts while disregarding the arrival characteristics of an initial test packet in each burst;
compute, for the predetermined codec, a Mean Opinion Score (MOS) for each burst based on the arrival characteristics of the test packets thereof;
determine the percentage of bursts in the series for which a corresponding MOS is above a predetermined threshold; and
determine whether call quality over the communication network is inadequate based on a percentage of bursts in the series for which the corresponding MOS is lower than the predetermined threshold.

* * * * *